United States Patent
Nishiguchi et al.

(10) Patent No.: US 7,225,261 B2
(45) Date of Patent: May 29, 2007

(54) SERVICE PROVISION METHOD, RELAY DEVICE, AND SERVICE PROVISION APPARATUS

(75) Inventors: Naoki Nishiguchi, Kawasaki (JP); Toshihiro Sonoda, Kawasaki (JP); Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 829 days.

(21) Appl. No.: 10/093,513

(22) Filed: Mar. 11, 2002

(65) Prior Publication Data

US 2003/0046411 A1   Mar. 6, 2003

(30) Foreign Application Priority Data

Sep. 3, 2001   (JP) .............................. 2001-266403

(51) Int. Cl.
*G06F 15/16* (2006.01)
*G06F 15/173* (2006.01)

(52) U.S. Cl. ...................................... 709/227
(58) Field of Classification Search ................ 709/203, 709/225, 227; 370/392
See application file for complete search history.

(56) References Cited

U.S. PATENT DOCUMENTS 6,751,221 B1 *   6/2004   Saito et al. ................. 370/392

2002/0138551 A1 *   9/2002   Erickson ..................... 709/203

FOREIGN PATENT DOCUMENTS

| JP | 10-191463 | 7/1998 |
|---|---|---|
| JP | 2001-53779 | 2/2001 |

* cited by examiner

*Primary Examiner*—Larry D. Donaghue
(74) *Attorney, Agent, or Firm*—Staas & Halsey LLP

(57) ABSTRACT

A method of providing a service to a terminal device via the Internet from a service provision apparatus in response to access from the terminal device includes the steps of (a) establishing and maintaining connection between the service provision apparatus and a relay device specified by a global IP address on the Internet at a request for connection of the service provision apparatus so that the service provision apparatus and the relay device are in communication with each other via the Internet, (b) accessing the service provision apparatus for the service by way of the relay device from the terminal device connected thereto, and (c) providing the service from the service provision apparatus to the terminal device by way of the relay device.

27 Claims, 16 Drawing Sheets

FIG.7

USER INFORMATION

| USER ID | PASSWORD | SERVER | SERVICE |
|---|---|---|---|
| user-1 | XXXXXXX | server-1, server-2 | HOUSEHOLD APPLIANCE CONTROL, MAIL |
| ... | ... | ... | ... |
| ANONYMOUS | | ALL | ALL |

FIG.10

ACCESS AUTHORIZATION INFORMATION

| SERVER | USER ID | TERMINAL INFORAMTION | ACCESSIBILITY | | | |
|---|---|---|---|---|---|---|
| | | | SERVER | HOUSEHOLD APPLIANCE CONTROL | MAIL | HOME CAMERA |
| server-1 | user-1 | SSL CONNECTION | ○ | ○ | ○ | ○ |
| | | CELLULAR PHONE | ○ | ○ | ○ | × |
| | | ANY IP ADDRESS | ○ | × | ○ | × |
| | ANONYMOUS | SPECIFIC IP ADDRESS | ○ | × | ○ | × |
| | | OTHER IP ADDRESSES | × | × | × | × |
| ⋮ | ⋮ | ⋮ | ⋮ | ⋮ | ⋮ | ⋮ |

FIG.12

SERVER INFORMATION

| SERVER | IP ADDRESS | ANOTHER NAME | ANONYMOUS USER USABILITY |
|---|---|---|---|
| server-1 | 192.168.0.1 | server-1-home | USABLE |
| server-2 | 192.168.100.1 | server-2-home | UNUSABLE |
| ... | ... | ... | ... |

FIG.14

SERVICE INFORMATION

| SERVER | SERVICE | TYPE | ANONYMOUS USER USABILITY |
|---|---|---|---|
| server-1 | ia-ctrl | HOUSEHOLD APPLIANCE CONTROL | USABLE |
| | mail | MAIL | USABLE |
| | camera | HOME CAMERA | USABLE |
| server-2 | control | HOUSEHOLD APPLIANCE CONTROL | UNUSABLE |
| ... | ... | ... | ... |

FIG.15

SERVER CONNECTION CONDITION

| SERVER | CONNECTION CONDITION | SERVICE PROVISION CONDITION | | |
|---|---|---|---|---|
| | | HOUSEHOLD APPLIANCE CONTROL | MAIL | HOME CAMERA |
| server-1 | CONNECTED | ○ | × | ○ |
| server-2 | DISCONNECTED | ○ | × | × |
| ... | ... | ... | ... | ... |

SERVICE PROVISION METHOD, RELAY DEVICE, AND SERVICE PROVISION APPARATUS

BACKGROUND OF THE INVENTION

1. Field of the Invention

The present invention generally relates to service provision methods, relay devices, and service provision apparatuses, and more particularly to a service provision method providing a service to a terminal device via the Internet from a service provision apparatus upon request from the terminal device, and a relay device and a service provision apparatus employed in providing a service to a terminal device in accordance with such a service provision method.

2. Description of the Related Art

The Internet is a network connecting a multitude of networks with one another by using TCP/IP, and has developed rapidly due to commercial IP connection services and functional improvement of browsers. Further, constant connection to the Internet, which used to be performed only by limited users such as corporate users, is enjoyed by more and more individual users through Internet service providers (ISP).

Since each user has her/his own system constantly connected to the Internet by this constant connection, each user may be able to set up her/his own Web site by using her/his own system. In order to set up services such as Web sites on the Internet, systems for providing the services are required to obtain global IP addresses that are determined uniquely on the Internet. Having no global IP address is just like having no fixed address. Therefore, the services may not be reached on the Internet without the global IP addresses.

However, not all the systems aiming at providing services can obtain the global IP addresses. Therefore, it is only a limited number of systems that can set up services on the Internet.

SUMMARY OF THE INVENTION

Accordingly, it is a general object of the present invention to provide a service provision method, a relay device, and a service provision apparatus by which the above-described disadvantage is eliminated.

A more specific object of the present invention is to provide a service provision method by which a service may be provided from a service provision apparatus to a terminal device via the Internet whether or not the service provision apparatus providing the service has a global IP address.

Another more specific object of the present invention is to provide a relay device and a service provision apparatus employed in providing a service to a terminal device in accordance with such a service provision method.

The above objects of the present invention are achieved by a method of providing a service to a terminal device via the Internet from a service provision apparatus in response to access from the terminal device, the method including the steps of (a) establishing and maintaining connection between the service provision apparatus and a relay device specified by a global IP address on the Internet at a request for connection of the service provision apparatus so that the service provision apparatus and the relay device are in communication with each other via the Internet, (b) accessing the service provision apparatus for the service by way of the relay device from the terminal device connected thereto, and (c) providing the service from the service provision apparatus to the terminal device by way of the relay device.

According to the above-described method, the terminal device is connected to the relay device specified by the global IP address on the Internet with the relay device and the service provision apparatus being connected with each other. Since the relay device has been communicatively connected to the service provision apparatus, access to the service from the terminal device is relayed to the service provision apparatus by the relay device. Then, the service provided from the service provision apparatus is relayed to the terminal device by the relay device. Therefore, irrespective of whether the service provision apparatus has obtained a global IP address, the service can be provided from the service provision apparatus to the terminal device via the Internet.

The above objects of the present invention are also achieved by a method of providing a service to a terminal device via the Internet from a specified one of a plurality of service provision apparatuses in response to access from the terminal device, the method including the steps of (a) establishing and maintaining connection between each of the service provision apparatuses and a relay device specified by a global IP address on the Internet at a request for connection of each of the service provision apparatuses so that each of the service provision apparatuses and the relay device are in communication with each other via the Internet, (b) accessing the specified one of the service provision apparatuses for the service by way of the relay device from the terminal device connected thereto, and (c) providing the service from the specified one of the service provision apparatuses to the terminal device by way of the relay device.

The same effect as described above can be produced by this method.

The above objects of the present invention are also achieved by a relay device specified by a global IP address on the Internet and relaying communication between a terminal device and a service provision apparatus, the relay device including a communication connection part establishing and maintaining connection between the service provision apparatus and the relay device at a request for connection of the service provision apparatus so that the service provision apparatus and the relay device are in communication with each other via the Internet, an access relay part relaying to the service provision apparatus access to a service from the terminal device connected to the relay device, and a service relay part relaying the service provided from the service provision part to the terminal device.

The above-described relay device is suitable for the above-described methods.

The above objects of the present invention are further achieved by a service provision apparatus providing a service to a terminal device via the Internet in response to access from the terminal device, the service provision apparatus including: a communication connection part making a request for connection to a relay device specified by a global IP address on the Internet, and establishing and maintaining connection between the relay device and the service provision apparatus so that the relay device and the service provision apparatus are in communication with each other via the Internet; and a service provision control part transferring to the relay device information on the service for the terminal device in response to the access from the terminal device, the access being relayed by the relay device, wherein the relay device relays the service based on the information to the terminal device.

The above-described service provision apparatus is suitable for the above-described methods.

BRIEF DESCRIPTION OF THE DRAWINGS

Other objects, features and advantages of the present invention will become more apparent from the following detailed description when read in conjunction with the accompanying drawings, in which:

FIG. 7 is a diagram showing contents of a user information database shown in FIG. 6;

FIG. 10 is a diagram showing contents of an access authorization information database shown in FIG. 6;

FIG. 12 is a diagram showing contents of a server information database shown in FIG. 6;

FIG. 14 is a diagram showing contents of a service list database shown in FIG. 6;

FIG. 15 is a diagram showing contents of a server connection condition database shown in FIG. 6.

DETAILED DESCRIPTION OF THE PREFERRED EMBODIMENTS

A description will be given, with reference to the accompanying drawings, of embodiments of the present invention.

[First Embodiment]

Figure 1:
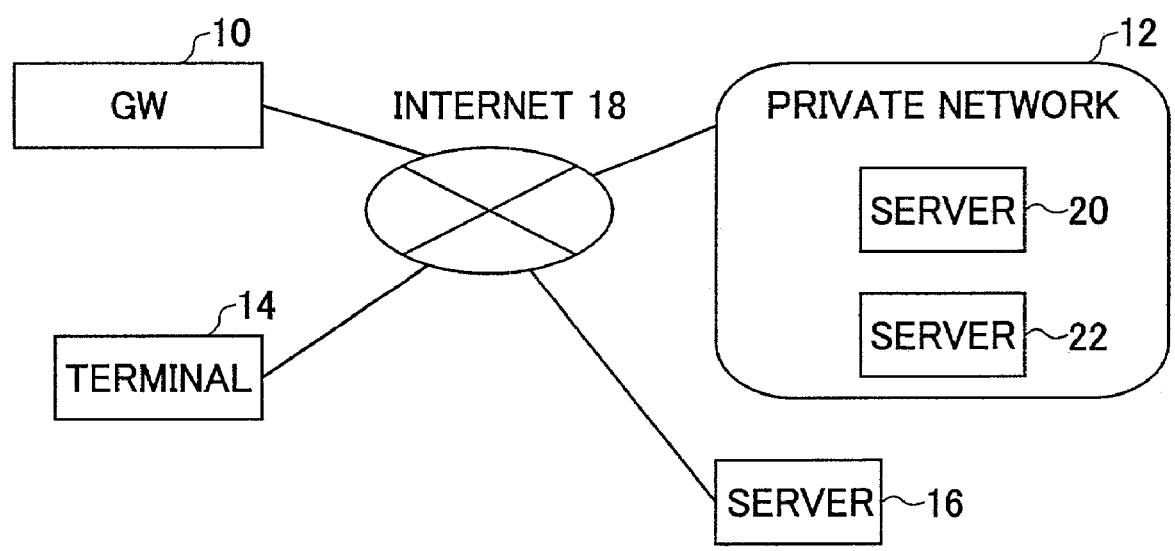
FIG. 1 is a diagram showing a service provision system according to a first embodiment of the present invention.

FIG. 1 is a diagram showing a service provision system according to a first embodiment of the present invention. The system of this embodiment includes a gateway (GW) 10, a private network 12, a terminal 14, and a server 16.

The GW 10 is a device that connects networks of basically different protocol systems by upper layer conversion, and is specified by a global IP address on the Internet 18. The private network 12 is connected to the Internet 18 and includes two servers 20 and 22. The server 16 has a global IP address and is directly connected to the Internet 18.

Thus, the present configuration of the Internet is that a first apparatus having a global IP address is connected to the Internet with a second apparatus having a private IP address being connected to the first apparatus.

Next, a description will be given of a case where a service is provided from the server 20 having a private address to the terminal 14 via the Internet 18 and the GW 10 in the above-described system.

Figure 2:
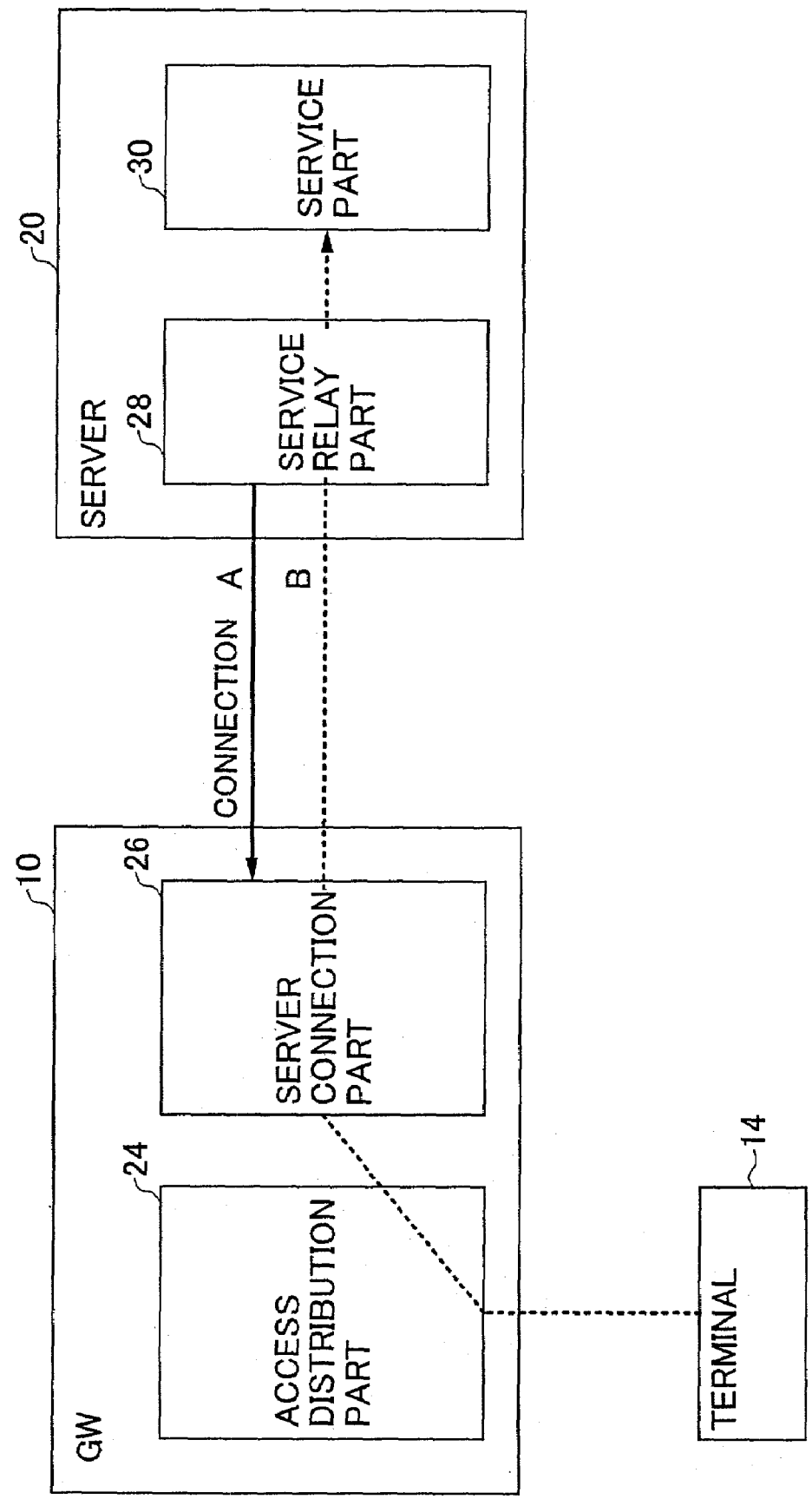
FIG. 2 is a diagram showing a configuration of a system formed by a gateway, a server, and a terminal shown in FIG. 1.

FIG. 2 is a diagram showing a configuration of a system formed by the GW 10, the server 20, and the terminal 14. In FIG. 2, the GW 10 includes an access distribution part 24 and a server connection part 26. The server 20 includes a service relay part 28 and a service part 30.

The server connection part 26 establishes and maintains connection between the server 20 and the GW 10 to serve as a relay between the terminal 14 and the server 20. The access distribution part 24 serve as a relay between the terminal 14 and the server connection part 26.

The service relay part 28 is connected to the server connection part 26 of the GW 10 and maintains connection thereto. The service part 30 provides a variety of services to the terminal 14. In this embodiment, the services provided are Web services.

Next, a description will be given, with reference to FIGS. 2 and 3, of an operation for connecting the terminal 14 and the server 20, and then a description will be given in detail of the server connection part 26 and the service relay part 28.

First, in order to connect the GW 10 and the server 20, the service relay part 28 of the server 20 makes a connection request A to the server connection part 26, thereby establishing connection and a communication channel with the GW 10.

Next, a description will be given, with reference to the flowchart of FIG. 3, of the operation for connecting the terminal 14 and the server 20 (an operation shown as a connection B in FIG. 2).

Figure 3:
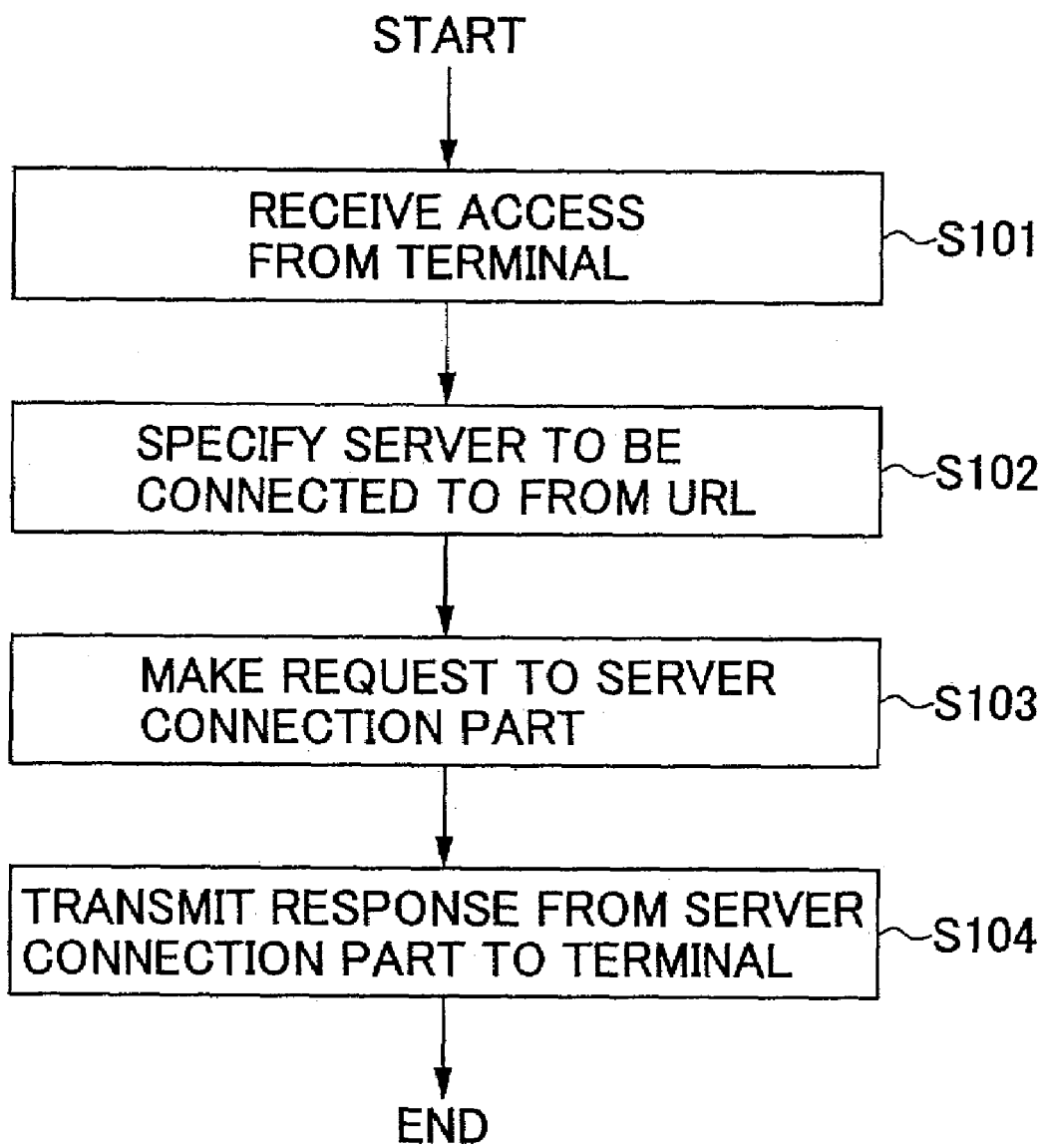
FIG. 3 is a flowchart of an operation of an access distribution part of the gateway of FIG. 2.

FIG. 3 is a flowchart of an operation of the access distribution part 24 in this connection operation. First, in step S101, the terminal 14 establishes connection with the access distribution part 24 of the GW 10. Then, in step S102, the terminal 14 specifies the URL (Uniform Resource Locator) of a server to which to be connected (the server 20). In this case, if the server 20 has a private IP address of 192.168.0.1, for instance, the terminal 14 transmits a request called a GET method. The GET method is a method for obtaining a resource represented by a specified URL and differs slightly depending on the setting of a proxy.

The proxy is a program that serves as a relay between a corporate network and an external Web site when visiting the external Web site from the office network. A server installed with the program is called a proxy server. For instance, if the terminal 14 is on a corporate network, an HTTP client such as the terminal 14 transmits a request to a proxy. The proxy transmits the request to an HTTP server and obtains data therefrom. The proxy transmits the obtained data to the HTTP client.

Therefore, the GET method may usually specify the name of a file to be obtained (for instance, index.html) as GET/index.html. However, when the proxy for the terminal 14 is set to the GW 10, the URL is required after "GET". Thus, the address of the file is specified as GET http://192.168.0.1/index.html.

If the proxy is otherwise set or no proxy setting is provided, the address of the file is specified as GET index.html?url=http://192.168.0.1/ by specifying the file name, inserting "?", and adding http://192.168.0.1/, which is information specifying the server 20 as an argument.

From this URL, the access distribution part 24 specifies the server 20 as a connection destination (in step S102), and in step S103, the access distribution part 24 transmits the above-described GET method to the server connection part 26. The server connection part 26 transmits the received GET method to the service relay part 28 of the server 20. The service relay part 28 transmits the received GET method to the service part 30.

When the GET method from the terminal 14 thus reaches the service part 30, in step S104, the GET method is processed in the server 20 just as in the case of accessing a common Web server from the server 20 so that header information constituted of a data size and a data update date and requested information are transmitted to the terminal 14.

As described above, service provision from the server 20 having only the private IP address to the terminal 14 can be realized by establishing first connection between the server 20 and the GW 10 and then connecting the established communication channel therebetween and the communication channel between the terminal 14 and the GW 10.

Figure 4:
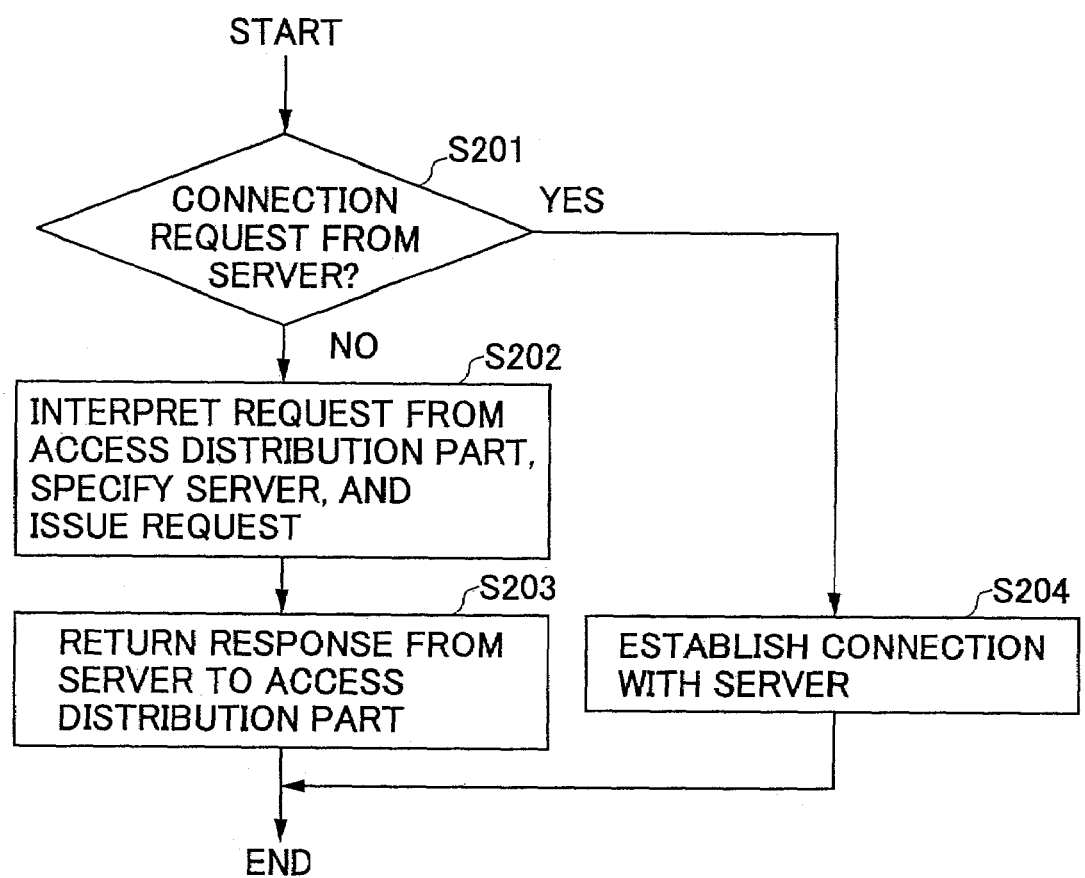
FIG. 4 is a flowchart of an operation of a server connection part of the gateway of FIG. 2.
Figure 5:
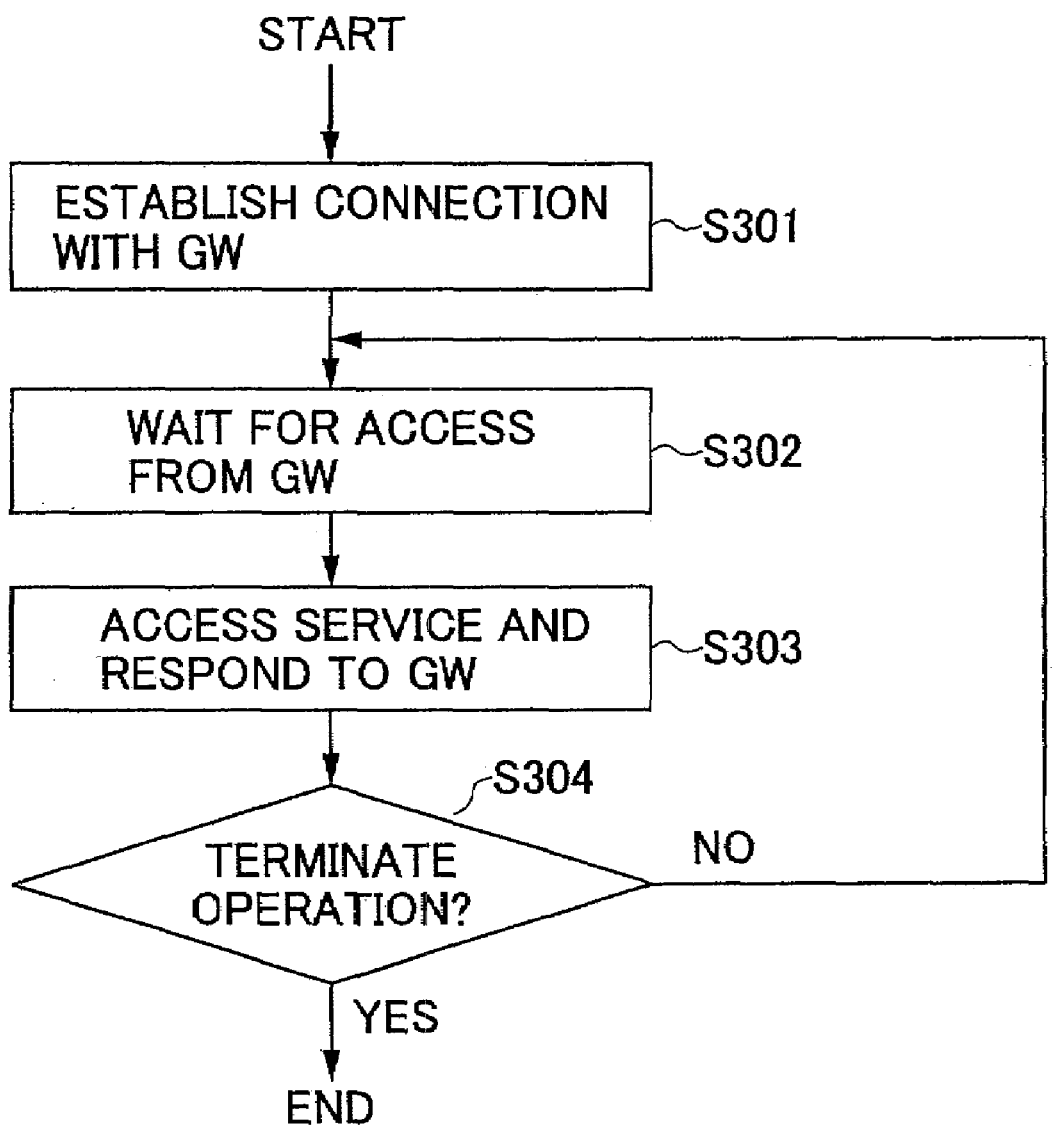
FIG. 5 is a flowchart of an operation of a service relay part of the server of FIG. 2.

Next, a detailed description will be given, with reference to FIGS. 4 and 5, of the server connection part 26 and the service relay part 28.

First, a description will be given, with reference to FIG. 4, of an operation of the server connection part 26.

As shown in FIG. 2, the server connection part 26 communicates (performs data transmission and reception) with both the server 20 and the access distribution part 24. Therefore, the server connection part 26 operates differently depending on whether a data transmitter is the server 20 or the access distribution part 24.

First, a description will be given of an operation for processing a connection request transmitted from the server 20 (YES in step S201). In this case, the server 20 is a data transmitter. In step S204, the server connection part 26 establishes connection with the server 20, and then terminates the operation. At this point, the server connection part 26 may obtain later-described server information from the server 20.

Next, a description will be given of an operation in the case where the access distribution part 24 is a data transmitter (NO in step S201). When the access distribution part 24 is a data transmitter, data transmission originates from the terminal 14. Therefore, in step S202, the server connection part 26 interprets a request whose contents include the above-described URL, specifies a server to be connected to (the server 20), and issues the request from the terminal 14 to the server 20. In step S203, the server connection part 26 returns a response from the server 20 to the access distribution part 24. This operation is based on the fact that the server 20 is connected to the server connection part 26. If the server 20 is not connected thereto, the server connection part 26 returns an error message to the access distribution part 24.

Next, a description will be given, with reference to FIG. 5, of an operation of the service relay part 28 provided in the server 20.

In step S301, first, the service relay part 28 makes a connection request to the GW 10 to be connected therewith, thereby establishing connection with the GW 10. Next, in step S302, in this connected state, the service relay part 28 waits for a service request transmitted via GW 10 from the terminal 14. Then, in step S303, upon receiving the service request, the service relay part 28 accesses the service part 30 and makes a response to the GW 10. Next, in step S304, the service relay part 28 determines whether to terminate the operation. If "NO" in step S304, the operation returns to step S302 so that the service relay part 28 waits for an access from the GW 10, and otherwise, the service relay part 28 terminates the operation.

By the above-described operations, the server 20 having the private IP address can provide the service to the terminal 14 via the GW 10 and the Internet 18.

[Second Embodiment]

Next, a description will be given of a second embodiment of the present invention. In the second embodiment, elements including a security function are considered in addition to the configuration of the first embodiment.

Figure 6:
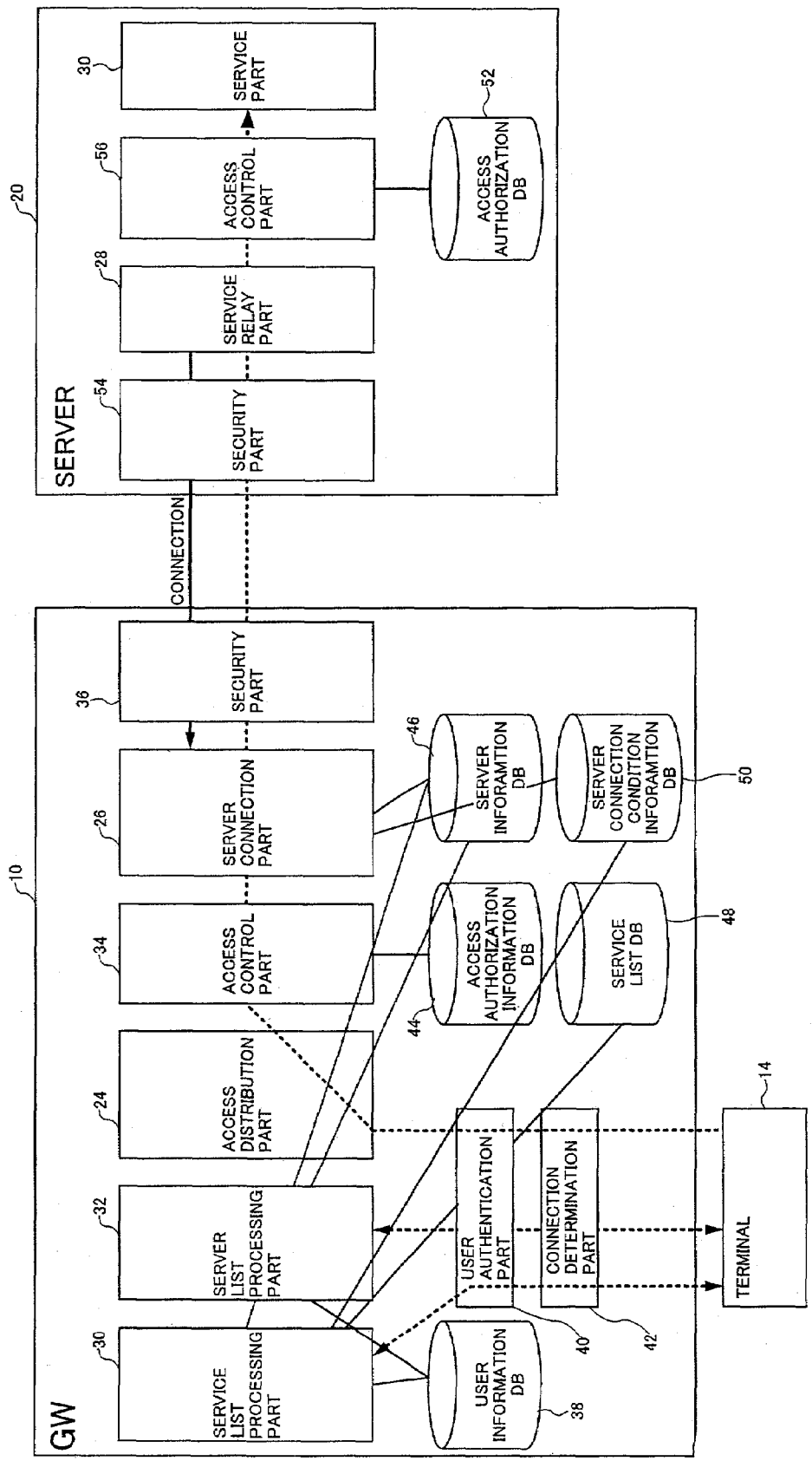
FIG. 6 is a diagram showing an overall system of a second embodiment of the present invention.

FIG. 6 is a diagram showing an overall system of the second embodiment.

In addition to the configuration of the first embodiment, the GW 10 includes a service list processing part 30, a server list processing part 32, an access control part 34, a security part 36, a user authentication part 40, and a connection determination part 42. Further, the GW 10 includes a variety of databases (DBs). Specifically, the GW 10 includes a user information DB 38, an access authorization information DB 44, a server information DB 46, a service list DB 48, and a server connection condition information DB 50.

Further, the server 20 includes a security part 54, an access control part 56, and an access authorization information DB 52 in addition to the configuration of the first embodiment. A description will be given herein of the details of the above-described parts and DBs of the GW 10 and the server 20.

First, a description will be given of the security parts 36 and 54. The security part 36 of the GW 10, together with the security part 54 of the server 20, hides communication between the GW 10 and the server 20 by using SSL (Secure Sockets Layer). SSL is a cryptosystem commonly used in Web services. According to SSL, in communication between a server holding a public key and a secret key and a client to be connected to the server, the server and the client communicate with each other by public-key cryptography until a common key is generated and then performs communication by common-key cryptography by using the generated common key.

In the case of using SSL, the server to which the client is connected should be granted a (digital) certificate by a certificate authority (CA). The certificate, which contains information including the above-described public key employed in public-key cryptography, verifies the authenticity of the public key of the server to which the client is connected. By this certificate, the client can confirm that its communication partner is the server, and performing communication by pretending to be an authorized user or server by using a technique called "spoofing" can be prevented.

As described above, it is the service-providing server that is supposed to have the certificate. Accordingly, in this embodiment, each service-providing server such as the server 20 is required to have the certificate. As previously described in the first embodiment, the server 20 is first connected to the GW 10. Therefore, if the GW 10 has the certificate, encrypted communication using SSL is performable between the GW 10 and the server 20. Further, encrypted communication is also performable between the terminal 14 and the GW 10 since the terminal 14 is connected to the GW 10 having the certificate employed in SSL. Accordingly, encrypted communication is performable between the terminal 14 and the server 20.

As described above, encrypted communication is performable between the server 20 and the terminal 14 without the server 20 having the certificate if the GW 10 only has the certificate.

Next, a description will be given of the user authentication part 40 and the user information DB 38 of FIG. 6. The user authentication part 40 refers to the user information DB 38 to authenticate a user connected to the GW 10. User information, which is recorded in the user information DB 38, includes information such as user ID, password, server, and service as shown in FIG. 7. The user ID is used to identify the user. The password is used to check whether the connected user is the user identified by the user ID. Further, the server information shows a server to which the user is accessible, and the service information shows the contents of a service provided to the user.

Figure 8:
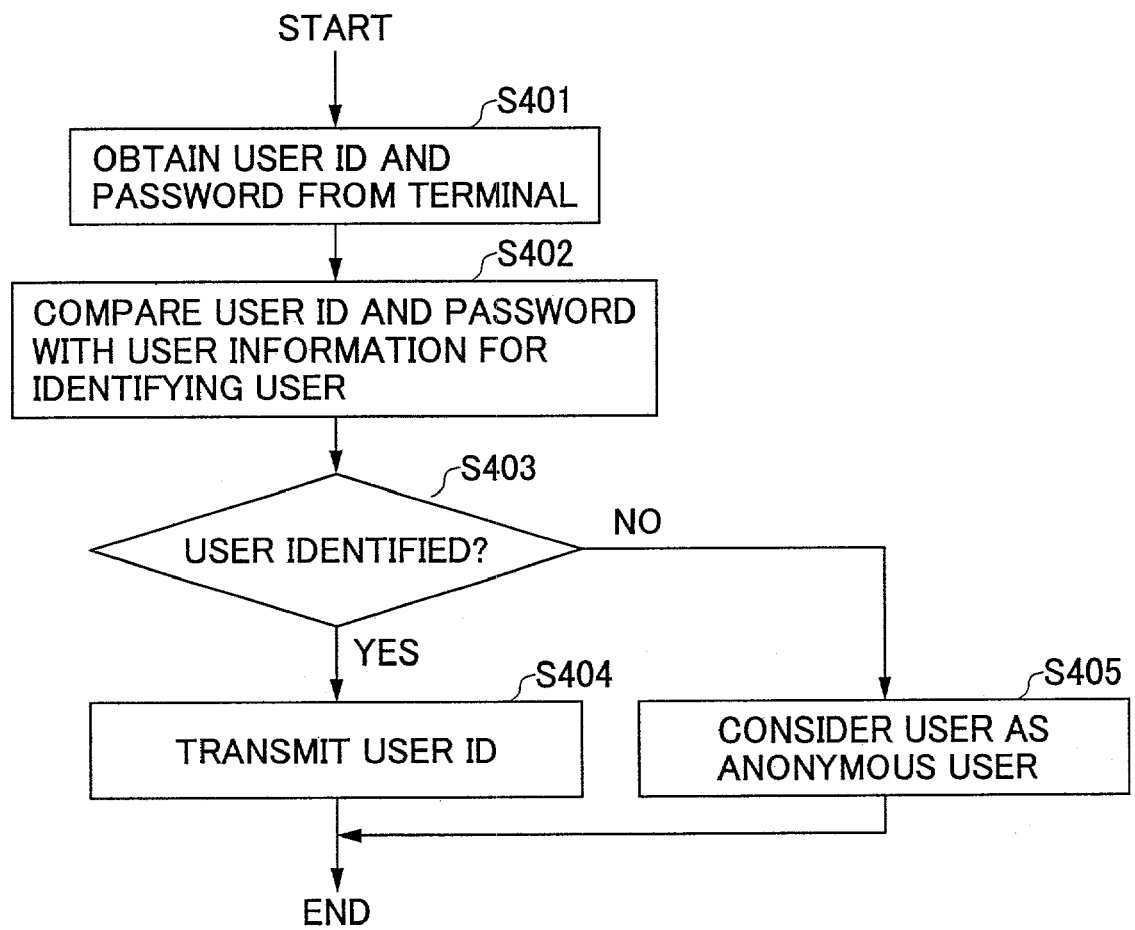
FIG. 8 is a flowchart of an operation of a user authentication part shown in FIG. 6.

Next, a description will be given, with reference to the flowchart of FIG. 8, of an operation of the user authentication part 40. First, in step S401, the user authentication part 40 obtains a user ID and a password for user identification from the terminal 14. Next, in step S402, the user authentication part 40 compares the input user ID and password with user information, and in step S403, determines whether the user is a true user. If the user is identified as who she or he claims to be (that is, "YES" in step S403), in step S404, the user authentication part 40 transmits the user ID to the access control part 34. If the input user information is not included in the user information stored in the user information DB 38 (that is, "NO" in step S403), in step S405, the user authentication part 40 informs the access control part 34 that the user is an anonymous user.

Figure 9:
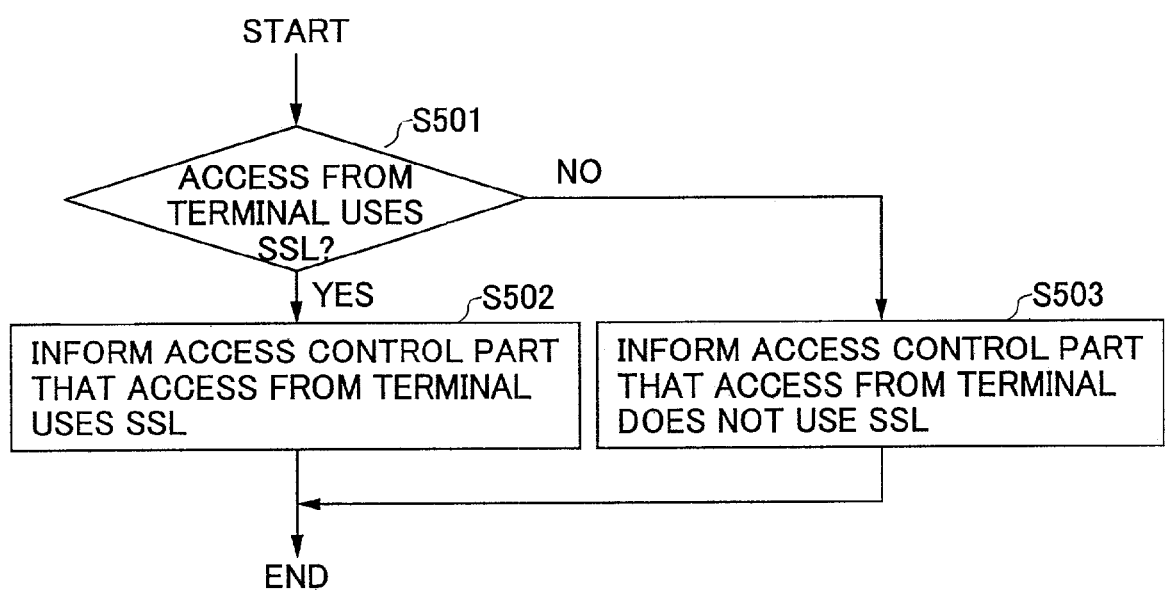
FIG. 9 is a flowchart of an operation of a connection determination part shown in FIG. 6.

Next, a description will be given of the connection determination part 42 of FIG. 6. The connection determination part 42 determines the connection type of the terminal 14, and informs the access control part 34 of the information of the terminal 14 (terminal information) obtained as a result of the determination. The connection type shows whether the terminal 14 is connected to the GW 10 through a cellular phone or by SSL, for instance. The connection type also expresses the IP address of the terminal 14. An operation of the connection determination part 42 in the case of determining whether the terminal 14 is connected by SSL is shown in the flowchart of FIG. 9. In step S501, the connection determination part 42 determines whether the terminal 14 is connected thereto by SSL. If the terminal is connected by SSL (that is, "YES" in step S501), in step S502, the connection determination part 42 informs the access control part 34 that the terminal 14 is connected by SSL. If the terminal 14 is not connected by SSL (that is, "NO" in step S501) in step S503, the connection determination part 42 informs the access control part 34 that the terminal 14 is not connected by SSL. Thus, the connection determination part 42 transmits the terminal information to the access control part 34.

Next, a description will be given of the access control part 34 of FIG. 6. As described above, the access control part 34 is informed of the user ID by the user authentication part 40 and of the terminal information by the connection determination part 42. The access control part 34 controls the access of the terminal 14 based on the above-described information provided by the user authentication part 40 and the connection determination part 42 and information stored in the access authorization information DB 44 of FIG. 6.

First, a description will be given, with reference to FIG. 10, of the access authorization information DB 44. The access authorization information DB is composed of items of server, user ID, terminal information, and accessibility. The item of accessibility further includes four items of server, household appliance control, mail, and home camera. The items are marked with circles if the items are accessible or controllable and by Xs if not. The item of server shows accessibility to a server-1 (for instance, the server 20) itself. The item of household appliance control shows controllability of a household appliance such as a home air-conditioner. The item of mail shows receivability of an e-mail service. The item of home camera shows controllability of a home monitoring camera, for instance.

For instance, access to the server-1 is authorized only when the user ID is user-1 or anonymous. Further, with respect to user-1, the server and the services of household appliance control, mail, and home camera are all accessible if the terminal information indicates SSL connection. On the other hand, if the user ID is anonymous and access to the GW 10 is made with an IP address other than a specific IP address, none of the server and the services of household appliance control, mail, and home camera is accessible.

Figure 11:
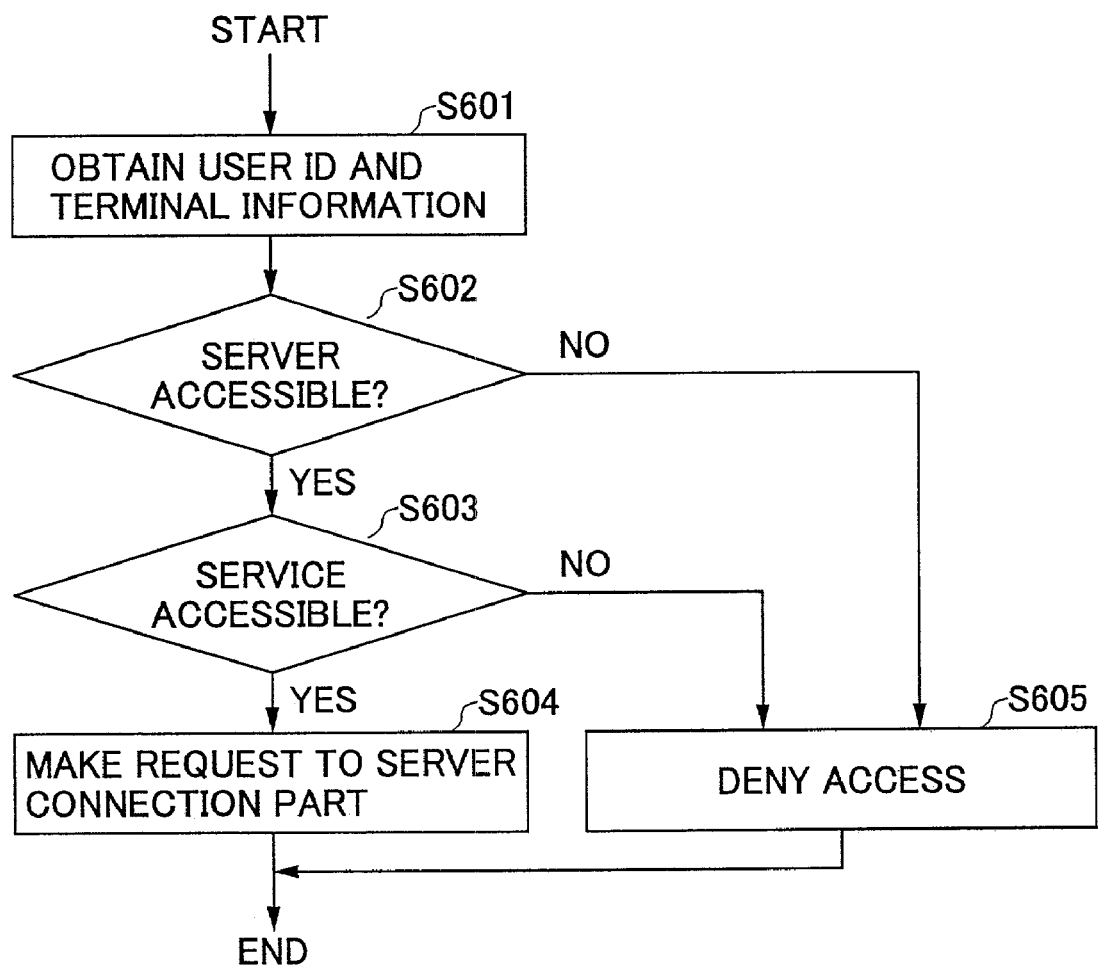
FIG. 11 is a flowchart of an operation of an access control part shown in FIG. 6.

Next, a description will be given, with reference to FIG. 11, of an operation of the access control part 34 in referring to the access authorization information DB 44. First, in step S601, the access control part 34 obtains the user ID from the user authentication part 40 and the terminal information from the connection determination part 42. Then, in step S602, the access control part 34 determines whether the server 20 is accessible by referring to the access authorization information DB 44 based on the user ID and the terminal information. If the access control part 34 determines that the server 20 is accessible (that is, "YES" in step S602), in step S603, the access control part 34 determines whether a desired service is accessible by referring to the access authorization information DB 44. If the access control part 34 determines that the desired service is accessible (that is, "YES" in step S603), in step S604, the access control part 34 makes a request as desired by the terminal 14 to the server connection part 26. If the server 20 is not accessible (that is, "NO" in step S602), in step S605, access thereto is denied. If the desired service is not accessible (that is, "NO" in step S603), in step S605, access thereto is denied.

Thereby, access control can be performed in accordance with the user ID and the connection type of the terminal 14. Further, the access control part 34 and the access authorization information DB 44 may be provided in the server 20 as the access control part 56 and the access authorization information DB 52 provided in the server 20 as shown in FIG. 6. The above-described access control can also be performed in such a case.

Next, a description will be given of the server list processing part 32 of FIG. 6. The server list processing part 32 generates a list of server information including a server IP address. FIG. 12 is a diagram showing the contents of the server information DB 46. The contents include items of server name, server IP address, another name for server, and usability by anonymous user. The item of usability by anonymous user shows whether a server is usable by an anonymous user. The server-1, for instance, is usable by an anonymous user, and has an IP address of 192.168.0.1 and another name of server-1-home.

Figure 13:
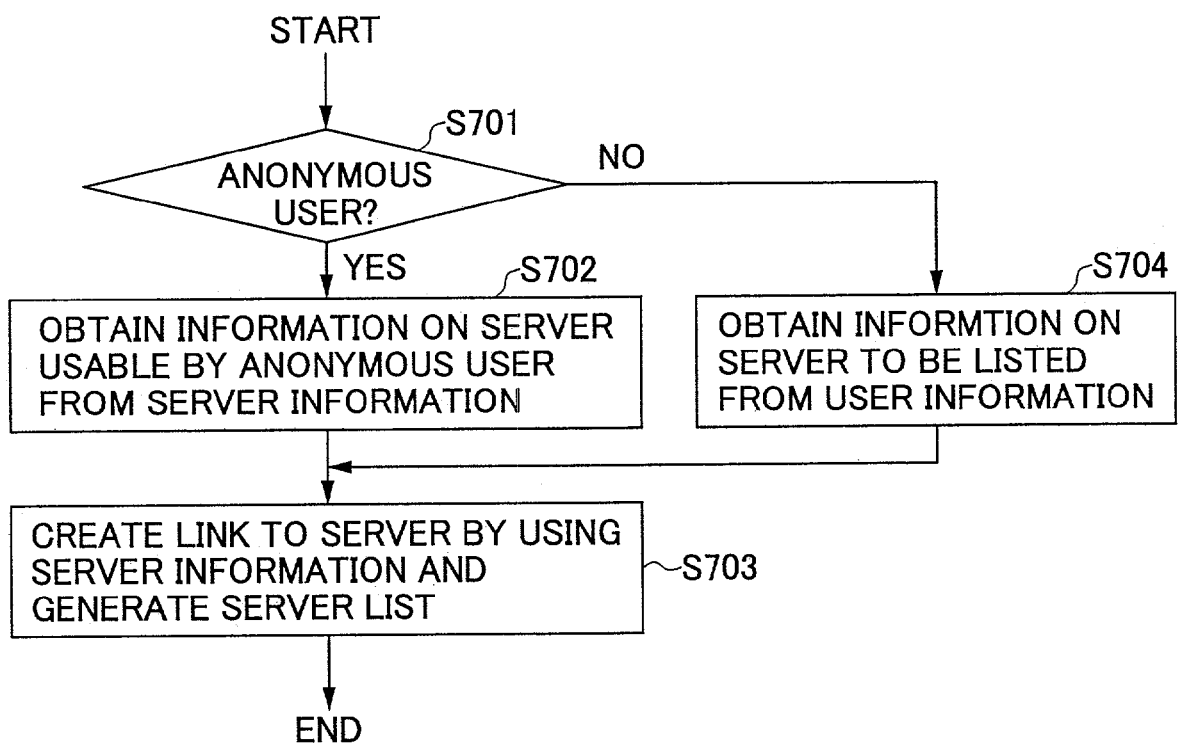
FIG. 13 is a flowchart of an operation of a server list processing part shown in FIG. 6.

Next, a description will be given, with reference to the flowchart of FIG. 13, of an operation of the server list processing part 32. First, in step S701, the server list processing part determines whether the connected user is an anonymous user. If the connected user is an anonymous user (that is, "YES" in step S701), in step S702, the server list processing part 32 obtains information on a server usable by an anonymous user from the server information DB 46. If the connected user is not an anonymous user (that is, "NO" in step S701), in step S704, the server list processing part 32 obtains information on a server usable by the user from the column of server of the user information DB 38 of FIG. 7. Thus, in step S703, the server list processing part 32 creates a server list based on the obtained information on the usable server whether the connected user is anonymous or identified by the user ID. Then, the server list processing part 32 transmits the server list to the terminal 14. Upon receiving the server list, the terminal 14 displays the server information on a browser. Alternatively, the terminal 14 may display the server information in a server-linkable manner.

Thereby, the user can recognize, select, and use a usable server.

Next, a description will be given of the service list processing part 30 of FIG. 6. The service list processing part 30 creates a list of services provided by each server (a service list) based on information stored in the service list DB 48 and the server connection condition information DB 50. FIG. 14 is a diagram showing the contents of the service list DB 48. The service list DB 48 includes information such as providable service, type of service, and usability by an anonymous user of each server. For instance, the service information of FIG. 14 shows that the server-1 listed in the column of server can provide three services of "ia-ctrl" whose service type is household appliance control, "mail" whose service type is mail, and "camera" whose service type is home camera. Further, the list also shows that all of the three services are usable by an anonymous user.

FIG. 15 is a diagram showing the contents of the server connection condition information DB 50. As shown in FIG. 15, the server connection condition information DB 50 includes information such as connection condition and service provision condition of each server. The server-1, for instance, is being connected to the GW 10 and is providing the services of household appliance control and home camera.

Figure 16:
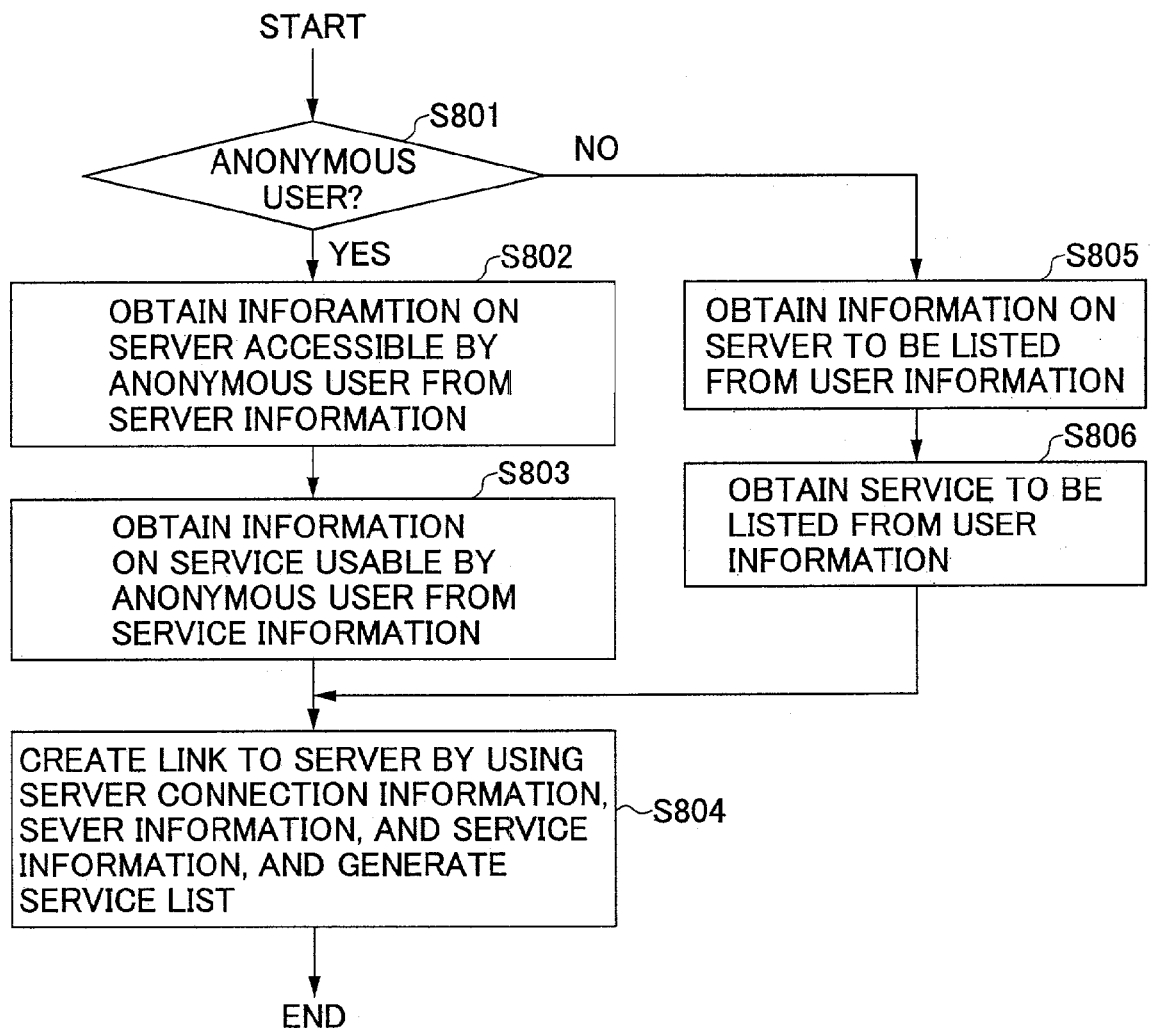
FIG. 16 is a flowchart of an operation of a service list processing part shown in FIG. 6.

Next, a description will be given, with reference to the flowchart of FIG. 16, of an operation of the service list processing part 30. The service list processing part 30 also operates differently depending on whether the connected user is anonymous or identified by the user ID. In step S801, the service list processing part 30 determines whether the connected user is an anonymous user. If the connected user is an anonymous user (that is, "YES" in step S801), in step S802, the service list processing part 30 obtains information on a server accessible by an anonymous user from the server information DB 46 of FIG. 12. Then, in step S803, the service list processing part 30 obtains information on a service usable by an anonymous user from the service list DB 48. If the connected user is not anonymous and is identified by the user ID (that is, "NO" in step S801), in step S805, the service list processing part 30 obtains information on a server accessible by the connected user from the user information DB 38. Next, in step S806, the service list processing part 30 obtains information on a service usable by the connected user from the user information DB 38. Thus, in step S804, the service list processing part 30 creates a service list composed of the service providable to the connected user (anonymous or identified) and the server connection information. That is, the service list presents the service provided by the server that is in connection and accessible by the user. The service list may be displayed on the browser as a link to the server.

The server connection part 26 of the GW 10 corresponds to a communication connection part of a relay device according to the present invention. Further, the access distribution part 24 and the server connection part 26 correspond to an access relay part and a service relay part of the relay device according to the present invention.

The security part 36 of the GW 10 corresponds to a security part of the relay device according to the present invention. Further, the access control part 34 corresponds to an access control part of the relay device according to the present invention.

The server list processing part 32 and the service list processing part 30 of the GW 10 correspond to an apparatus information presentation part and a service information presentation part of the relay device according to the present invention, respectively.

According to a service provision method of the present invention, an authentication operation is performed between a relay device (the GW 10) and a service provision apparatus (the server 20) for access to a service from any terminal device (the terminal 14). Therefore, authentication is omittable between the service provision apparatus and the terminal device when the terminal device receives the service. Further, all information required for the authentication operation, such as a certificate, can be managed by the relay device. As a result, security for service provision can be obtained relatively easily.

Further, service provision is controllable depending on the type, the attribute, and the user of the terminal device.

Thereby, according to the service provision method of the present invention, service provision to the terminal device can be controlled in accordance with a security level based on a type of connection between the terminal device and the relay device. The type of connection may be expressed by the physical aspect of a transmission path between the terminal device and the relay device, such as the presence or absence of a radio section, a transmission medium employed for the transmission path (an optical fiber, an electric wire, a microwave, or an electric wave), or the length of the transmission path. The type of connection may be expressed in terms of a communicational function by the type of an algorithm employed for communication between the terminal device and the relay device, or the presence or absence or the type of a special security measure, for instance. Further, the type of connection may be a combination of both types.

Moreover, according to the service provision method of the present invention, the user of the terminal device can easily select a service provision apparatus from which the user may receive a service. Furthermore, the user of the terminal device may be easily informed of a service accessible by the user.

The present invention is not limited to the specifically disclosed embodiments, but variations and modifications may be made without departing from the scope of the present invention.

The present application is based on Japanese priority application No. 2001-266403 filed on Sep. 3, 2001, the entire contents of which are hereby incorporated by reference.

What is claimed is:

1. A method of providing a service to a terminal device via the Internet from a service provision apparatus in response to access from the terminal device, the method comprising:
   establishing and maintaining a connection between the service provision apparatus and a relay device specified by a global IP address on the Internet at a request for connection of the service provision apparatus so that the service provision apparatus and the relay device are in communication with each other via the Internet;
   accessing the service provision apparatus for the service by way of the relay device from the terminal device connected thereto; and
   providing the service from the service provision apparatus to the terminal device by way of the relay device.

2. The method as claimed in claim 1, wherein said establishing and maintaining establishes and maintains a connection between each of a plurality of service provision apparatuses and the relay device at a request for connection of each of the service provision apparatuses so that each of the service provision apparatuses and the relay device are in communication with each other via the Internet;
said accessing accesses a specified one of the service provision apparatuses for a service by way of the relay device from the terminal device connected thereto; and
said providing provides the service from the specified one of the service provision apparatuses to the terminal device by way of the relay device.

3. The method as claimed in claim 1, further comprising performing an authentication operation in accordance with a given algorithm between the relay device and the service provision apparatus, wherein said accessing is performed with security obtained as a result of the authentication operation after said establishing and maintaining.

4. The method as claimed in claim 3, wherein said providing is performed with the relay device being provided with a certificate based on SSL.

5. The method as claimed in claim 1, further comprising controlling whether to authorize the access from the terminal device to the service based on service authorization information showing accessibility from the terminal device to the service, the accessibility being determined in accordance with a given standard,
wherein said providing is performed during said accessing.

6. The method as claimed in claim 5, wherein said performing is performed by at least one of the relay device and the service provision apparatus.

7. The method as claimed in claim 1, further comprising controlling whether to authorize the access from the terminal device to the service based on a type of connection between the terminal device and the relay device before said accessing the service provision apparatus.

8. The method as claimed in claim 1, further comprising transferring from the relay device to the terminal device information specifying one or a plurality of service provision apparatuses connected to the relay device when the terminal device is connected to the relay device.

9. The method as claimed in claim 8, further comprising limiting the information to be transferred from the relay device to the terminal device based on user information transferred from the terminal device to the relay device and a relationship between a user specified by the user information and a service provision apparatus usable by the user.

10. The method as claimed in claim 1, further comprising transferring from the relay device to the terminal device information on services provided by one or a plurality of the service provision apparatuses connected to the relay device when the terminal device is connected to the relay device.

11. The method as claimed in claim 1, further comprising transferring from the relay device to the terminal device information on a condition of connection between the relay device and one or a plurality of service provision apparatuses connected thereto when the terminal device is connected to the relay device.

12. A method of providing a service to a terminal device via the Internet from a specified one of a plurality of service provision apparatuses in response to access from the terminal device, the method comprising:
establishing and maintaining connection between each of the service provision apparatuses and a relay device specified by a global IP address on the Internet at a request for connection of each of the service provision apparatuses so that each of the service provision apparatuses and the relay device are in communication with each other via the Internet;
accessing the specified one of the service provision apparatuses for the service by way of the relay device from the terminal device connected thereto; and
providing the service from the specified one of the service provision apparatuses to the terminal device by way of the relay device.

13. A relay device specified by a global IP address on the Internet and relaying communication between a terminal device and a service provision apparatus, the relay device comprising:
a communication connection part establishing and maintaining connection between the service provision apparatus and the relay device at a request for connection of the service provision apparatus so that the service provision apparatus and the relay device are in communication with each other via the Internet;
an access relay part relaying to the service provision apparatus access to a service from the terminal device connected to the relay device; and
a service relay part relaying the service provided from the service provision part to the terminal device.

14. The relay device as claimed in claim 13, wherein said communication connection part establishes and maintains connection between the relay device and each of a plurality of service provision apparatuses at a request for connection of each of the service provision apparatuses so that the relay device and each of the service provision apparatuses are in communication with each other via the Internet;
said access relay part relaying to a specified one of the service provision apparatuses access to a service from the terminal device; and
said service relay part relaying the service provided from the specified one of the service provision apparatuses to the terminal device.

15. The relay device as claimed in claim 13, further comprising a security part performing an authentication operation in accordance with a given algorithm between the relay device and the service provision apparatus, and obtaining security based on a result of the authentication operation when said access relay part relays to the service provision apparatus the access to the service from the terminal device.

16. The relay device as claimed in claim 13, further comprising an access control part controlling whether to authorize the access to the service from the terminal device based on service authorization information showing accessibility to the service from the terminal device before said access relay part relays the access to the service provision apparatus, the accessibility being determined in accordance with a given standard.

17. The relay device as claimed in claim 13, further comprising an access control part controlling whether to authorize the access to the service from the terminal device based on a type of connection between the relay device and the terminal device before said access relay part relays to the service provision apparatus the access to the service from the terminal device.

18. The relay device as claimed in claim 13, further comprising an apparatus information presentation part transferring to the terminal device information specifying one or a plurality of service provision apparatuses connected to the relay device when the terminal device is connected to the relay device.

19. The relay device as claimed in claim 18, further comprising:
a user information storage part storing a relationship between a user specified by user information transferred from the terminal device and a service provision apparatus usable by the user; and an apparatus information limitation part limiting said information to be transferred to the terminal device based on the user information and the relationship stored in said user information storage part.

20. The relay device as claimed in claim 13, further comprising a service information presentation part transferring to the terminal device information on services provided by one or a plurality of service provision apparatuses connected to the relay device when the terminal device is connected to the relay device.

21. The relay device as claimed in claim 13, further comprising a connection condition presentation part transferring information on a condition of connection between the relay device and one or a plurality of service provision apparatuses connected thereto when the terminal device is connected to the relay device.

22. A service provision apparatus providing a service to a terminal device via the Internet in response to access from the terminal device, the service provision apparatus comprising:

a communication connection part making a request for connection to a relay device specified by a global IP address on the Internet, and establishing and maintaining connection between the relay device and the service provision apparatus so that the relay device and the service provision apparatus are in communication with each other via the Internet; and a service provision control part transferring to the relay device information on the service for the terminal device in response to the access from the terminal device, the access being relayed by the relay device, wherein the relay device relays the service based on the information to the terminal device.

23. The service provision apparatus as claimed in claim 22, further comprising an access control part controlling, based on service authorization information showing accessibility to the service from the terminal device before said service provision control part responds to the access to the service relayed by the relay device, whether or not said service provision control part transfers the information on the service to the relay device in response to the access to the service, the accessibility being determined in accordance with a given standard.

24. A method of providing a service to a terminal device via the Internet from a service provision apparatus having a private IP address in response to access from the terminal device, the method comprising:

establishing and maintaining a connection between the service provision apparatus and a relay device specified by a global IP address on the Internet at a request for connection of the service provision apparatus so that the service provision apparatus and the relay device are in communication with each other via the Internet;

accessing the service provision apparatus for the service by way of the relay device from the terminal device connected thereto; and providing the service from the service provision apparatus to the terminal device by way of the relay device.

25. A method of providing a service to a terminal device via the Internet from a specified one of a plurality of service provision apparatuses in response to access from the terminal device, the specified one of the service provision apparatuses having a private IP address, the method comprising:

establishing and maintaining connection between each of the service provision apparatuses and a relay device specified by a global IP address on the Internet at a request for connection of each of the service provision apparatuses so that each of the service provision apparatuses and the relay device are in communication with each other via the Internet;

accessing the specified one of the service provision apparatuses for the service by way of the relay device from the terminal device connected thereto; and providing the service from the specified one of the service provision apparatuses to the terminal device by way of the relay device.

26. A relay device specified by a global IP address on the Internet and relaying communication between a terminal device and a service provision apparatus having a private IP address, the relay device comprising:

a communication connection part establishing and maintaining connection between the service provision apparatus and the relay device at a request for connection of the service provision apparatus so that the service provision apparatus and the relay device are in communication with each other via the Internet;

an access relay part relaying to the service provision apparatus access to a service from the terminal device connected to the relay device; and a service relay part relaying the service provided from the service provision part to the terminal device.

27. A service provision apparatus providing a service to a terminal device via the Internet in response to access from the terminal device, the service provision apparatus having a private IP address, the service provision apparatus comprising:

a communication connection part making a request for connection to a relay device specified by a global IP address on the Internet, and establishing and maintaining connection between the relay device and the service provision apparatus so that the relay device and the service provision apparatus are in communication with each other via the Internet; and a service provision control part transferring to the relay device information on the service for the terminal device in response to the access from the terminal device, the access being relayed by the relay device, wherein the relay device relays the service based on the information to the terminal device.

* * * * *